(12) United States Patent
Manasse et al.

(10) Patent No.: US 7,203,343 B2
(45) Date of Patent: Apr. 10, 2007

(54) SYSTEM AND METHOD FOR DETERMINING LIKELY IDENTITY IN A BIOMETRIC DATABASE

(75) Inventors: Mark S. Manasse, San Francisco, CA (US); Andrei Z. Broder, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 931 days.

(21) Appl. No.: 09/960,583

(22) Filed: Sep. 21, 2001

(65) Prior Publication Data

US 2003/0061233 A1    Mar. 27, 2003

(51) Int. Cl.
G06K 9/00      (2006.01)
G06K 9/46      (2006.01)
G06K 9/64      (2006.01)
G06K 9/34      (2006.01)
G06F 7/00      (2006.01)
G06F 17/30     (2006.01)
H04L 9/00      (2006.01)

(52) U.S. Cl. ............... 382/115; 382/209; 382/173; 707/4; 713/170

(58) Field of Classification Search ........ 382/115–118, 382/124–127, 190, 195, 209, 217, 218, 173; 707/4, 103 R; 713/170
See application file for complete search history.

(56) References Cited

U.S. PATENT DOCUMENTS

| 4,641,349 | A | 2/1987 | Flom et al. ............... 382/117 |
| 5,291,560 | A | * 3/1994 | Daugman ................. 382/117 |
| 6,119,124 | A | 9/2000 | Broder et al. .......... 707/103 R |
| 6,269,362 | B1 | 7/2001 | Broder et al. ................. 707/4 |
| 6,332,193 | B1 | * 12/2001 | Glass et al. ................ 713/170 |

OTHER PUBLICATIONS

Soutar et al., 1999, "Biometric Encription". (pp. 1-28).*
Zhu et al., IEEE Publication, 2000, "Biometric personal identification based on iris patterns". (pp. 801-804).*
Boles et al., IEEE Publication, 1998, "A human identification and technique using images of the iris and wavelet transform". (pp. 1185-1188).*
Williams, IEEE Publication, 1997, "Iris recognition technology". (pp. 23-29).*

* cited by examiner

Primary Examiner—Bhavesh M. Mehta
Assistant Examiner—Manav Seth
(74) Attorney, Agent, or Firm—Richard Lange

(57) ABSTRACT

A system and method for finding one or more target biometric samples that are similar to or match a query biometric sample. A query feature vector is generated from a query biometric vector. The query biometric vector represents the query biometric sample as a set of characteristics. The characteristics are either invariable or variable. The query feature vector comprises a plurality of features which are derived from the query biometric vector using a process that includes canonicalization of the characters in the biometric vector. The query feature vector is compared to a plurality of similarly created target feature vectors, each target feature vector representing a respective target biometric sample. A target biometric sample is a potential match to the query biometric sample when a threshold number of features in the corresponding target feature vector are identical to features in the query biometric vector.

26 Claims, 9 Drawing Sheets

SYSTEM AND METHOD FOR DETERMINING LIKELY IDENTITY IN A BIOMETRIC DATABASE

The present invention relates generally to systems and methods for finding a small set of potential matches from a large database of biometric information about individuals. In particular, the present invention determines likely matches to a query biometric vector in a target biometric database, where the query biometric vector represents a biometric sample.

BACKGROUND OF THE INVENTION

Several systems have recently been developed for determining whether an individual (or a biometric sample derived from the individual), is present in a small database of biometric information (of, say, fingerprints, or iris scans). Because these biometric measurements may be somewhat imprecise, identification of the set of individuals who match two hundred out of a possible set of three hundred characteristics of a sampled individual in a database of several billion individuals is currently beyond what existing systems can do.

Existing methods require comparing the entire collection of characteristics for a sampled individual against the entire database of characteristics for known individuals. Exemplary characteristics in the case where the biometric data represents an eye scan includes various characteristics of the iris, including eye color, the number of radial furrows and the number of concentric furrows in the iris, the size, number, shape and/or location of moles, freckles and crypts within the iris, and so forth. Known techniques require comparisons proportional to the number of characteristics in each sample multiplied by the number of individuals in the database. However, systems that can practically scale to handle a database of individuals of the size of the number of ATM users in the world, or the number of passport holders, or the total number of people are not found in the known art.

As the underlying technologies for biometric identification have improved (cf. www. sensar.com, www.identicator.com, and U.S. Pat. No. 4,641,349 for examples), the systems for handling the problem of matching an unknown individual or biometric sample against a small set of people or known biometric samples has improved significantly, to the point where such systems can reasonably be used to allow an individual to log on to her computer. The techniques tend to involve the comparison of hundreds of extracted characteristics for near-equality.

A fundamental problem with known techniques is that they do not provide a robust solution for comparing the variable characteristics found in biometric data. Variable characteristics are broadly defined as those characteristics that are represented by one value, but in fact, the true value for the characteristic is any of a range of values about the given value. Variable characteristics arise in biometric data due to inaccuracies in measuring the underlying biometric sample, qualitative assumptions made when examining the biometric sample, etc.

Given the above background, what is needed in the art are systems and methods for effectively comparing a query biometric sample against a large set of target biometric samples. Such systems and methods must provide robust solutions to the problem of comparing variable characteristics typically associated with biometric data.

SUMMARY OF THE INVENTION

This invention provides a mechanism for canonicalizing both exact (nonvariable) and inexact (variable) characteristics and then reducing the canonicalized set of characteristics that represents a biometric sample to a manageable size, such that exact or near-exact matching on the reduced set of characteristics can be performed to determine a small set of potentially matching identities. The small set of potentially matching identities can then be examined at greater length using known techniques to determine whether a match exists. Such biometric identity matching is useful, for example, in bank ATM systems, passport control systems, network logon to computer systems, driver identification, surveillance operations, or other domains where the identification of individuals is useful.

One aspect of the present invention provides a method for finding one or more target biometric samples that are similar to or match a query biometric sample. In the method a query feature vector is generated from a query biometric vector. The query biometric vector represents the query biometric sample as a set of characteristics. The query feature vector comprises a plurality of features. The query feature vector is compared to a plurality of target feature vectors, each target feature vector representing a different target biometric sample. A target biometric sample is a potential match to the query biometric sample when at least a threshold number of features in the corresponding target feature vector are identical to features in the query biometric vector.

In one embodiment of the present invention the generation of the query feature vector comprises a method. In the method, a set of tiles that represents the query biometric sample are extracted from the query biometric vector. Each tile includes a plurality of characteristics. An identification element is assigned to each tile in the set of tiles, thereby creating a set of identification elements. A predetermined number of identification elements are selected from the set of identification elements. The selected identification elements are partitioned into a plurality of partitioned groups. Finally, a fingerprint function is applied to each partitioned group to generate a set of features, the set of features representing the query feature vector.

Another aspect of the present invention is using the feature vectors to identify for a given query feature vector a set of best matching target feature vectors, which correspond to a set of candidate biometric vectors in a database of biometric vectors. The candidate biometric vectors, which are typically very small in number compared to the number of biometric feature vectors in the database, can then be processed to determine if the query biometric vector is a true match for any of the candidate biometric vectors. In one embodiment of the present invention, this aspect of the present invention is performed by extracting a set of target feature vectors from a database. Each extracted target feature vector includes at least one feature that is in common with a feature in the query feature vector. Each target feature vector in the set of target feature vectors is located in a count hash table. The count hash table includes target feature vector identifications corresponding to target feature vectors that share at least one feature in common with the target feature vector. The count hash table includes a count of matching features for each target feature vector represented by the table. Finally, the count of matching features is incremented for each located target feature identification.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DESCRIPTION OF THE PREFERRED EMBODIMENTS

This system and method of the present invention allows for the reduction of the hundreds of individual characteristics associated with any given biometric sample to a handful of combined characteristics, allowing for controlled degrees of precision in the measurement of the individual characteristics without resorting to simple quantification. To illustrate the power of this method consider that the reduction of each individual record to approximately 50 bytes means that a standard DVD could be distributed with enough information to allow rapid preliminary identification of approximately 100 million individuals, and that disk storage adequate to allow the identification of every person on Earth (if the biometric information could be collected) would cost under $10,000, providing sufficient information to identify a small candidate set of matches (e.g., less than 100 individuals). If the recorded information included information as to the network address at which complete details could be retrieved on an individual, the matching could be made as precise as the underlying biometric information admits, by resorting to the underlying techniques on the candidate set.

In the present invention certain terminology is used. In particular the term biometric sample is used. A biometric sample represents some unique aspect about an individual, such as a full description of the individual's eyes, a finger print, a foot print, or a blood sample. A biometric sample is represented by a biometric vector. A biometric vector is a collection of characteristics that uniquely describe the underlying biometric sample. Such characteristics are often measurements of certain features of the biometric sample, such as the number, size, shape and/or location of various features of the iris of a person's eye. A biometric vector is represented in digital form where each characteristic is represented by a sufficient number of bits. A biometric vector may include variable (inexact) characteristics and invariable (exact) characteristics. Using the methods of the present invention, a query biometric vector is reduced to a corresponding feature vector that is rapidly matched with target feature vectors that correspond to known (target) biometric samples. The present invention uses feature vectors to solve the problems associated with comparing a large number of inexact or variable characteristics.

Figure 1:
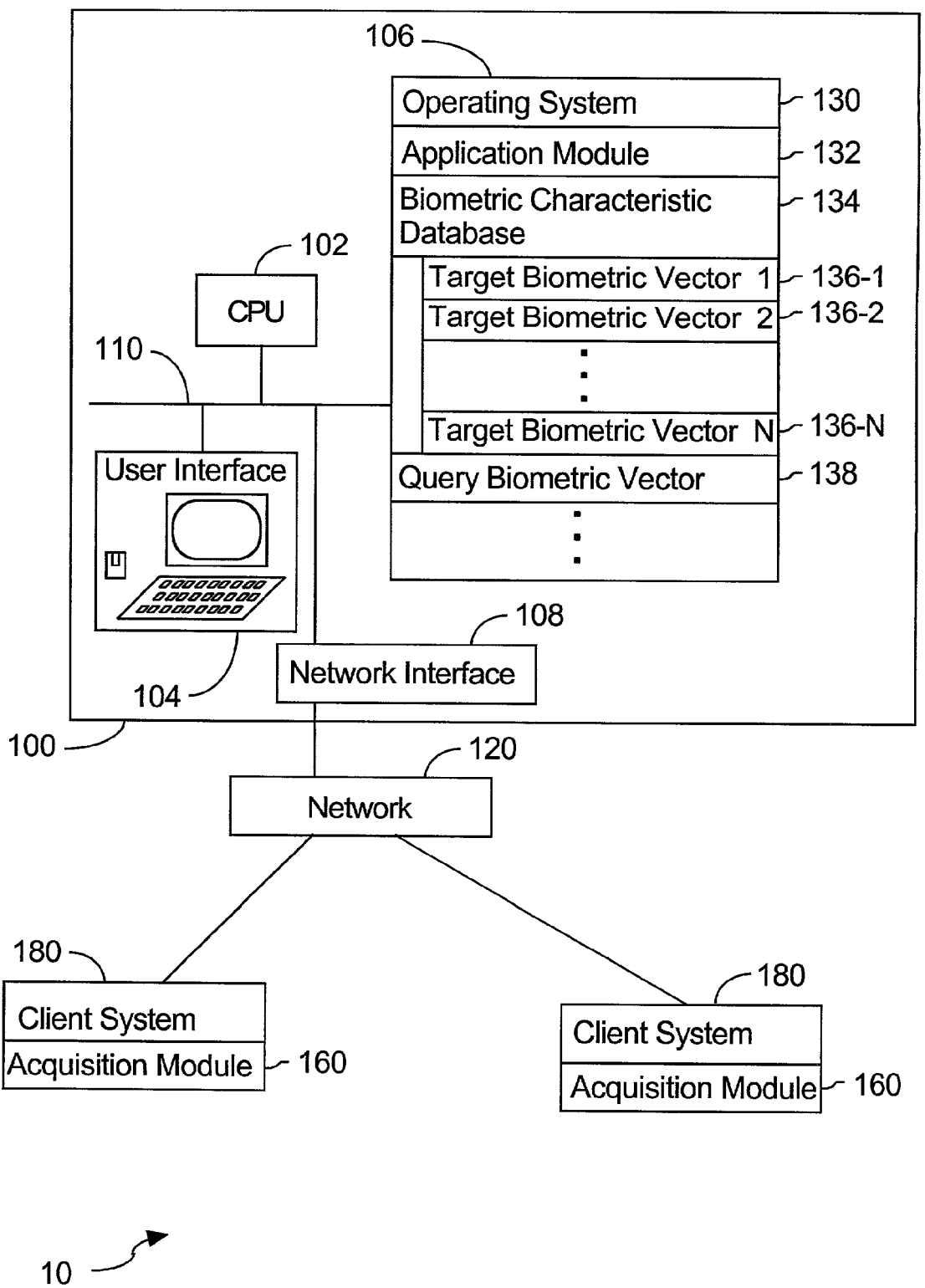
FIG. 1 illustrates a system that is operated in accordance with an embodiment of the invention.

FIG. 1 illustrates a system 10 that is operated in accordance with one embodiment of the invention. System 10 includes a plurality of client computers or measuring devices (such as eye scanners) 180 and at least one server 100. In some embodiments, each computer or device 180 includes an acquisition module 160 for measuring a biometric sample and generating a biometric vector that uniquely describes the biometric sample. Client computers/devices 180 and server 100 are connected by a communications network 120. Network 120 is a local area network (LAN), wide area network (WAN), metropolitan area network (MAN), an Intranet, the Internet, or a combination of such networks.

Server 100 includes standard server components including a central processing unit 102, user input/output device 104, memory 106, a network interface 108 for coupling the server 100 to other computers via a communication network 120, and one or more busses 110 that interconnect these components. Memory 106, which typically includes high speed random access memory as well as non-volatile storage such as disk storage, stores an operating system 130. Operating system 130 includes procedures for handling various basic system services and for performing hardware dependent tasks.

Memory 106 further stores an application module 132, a biometric characteristic database 134, and a query biometric vector 138. Application module 132 is used to process biometric vectors into feature vectors and to compare the feature vectors. Biometric characteristic database 134 includes a plurality of target biometric vectors 136. Each target biometric vector 136 describes or represents a known (target) biometric sample. In some embodiments of the invention a biometric feature database (not shown) is used instead of database 134. The biometric feature database is populated with target feature vectors rather than target biometric vectors.

Figure 2:
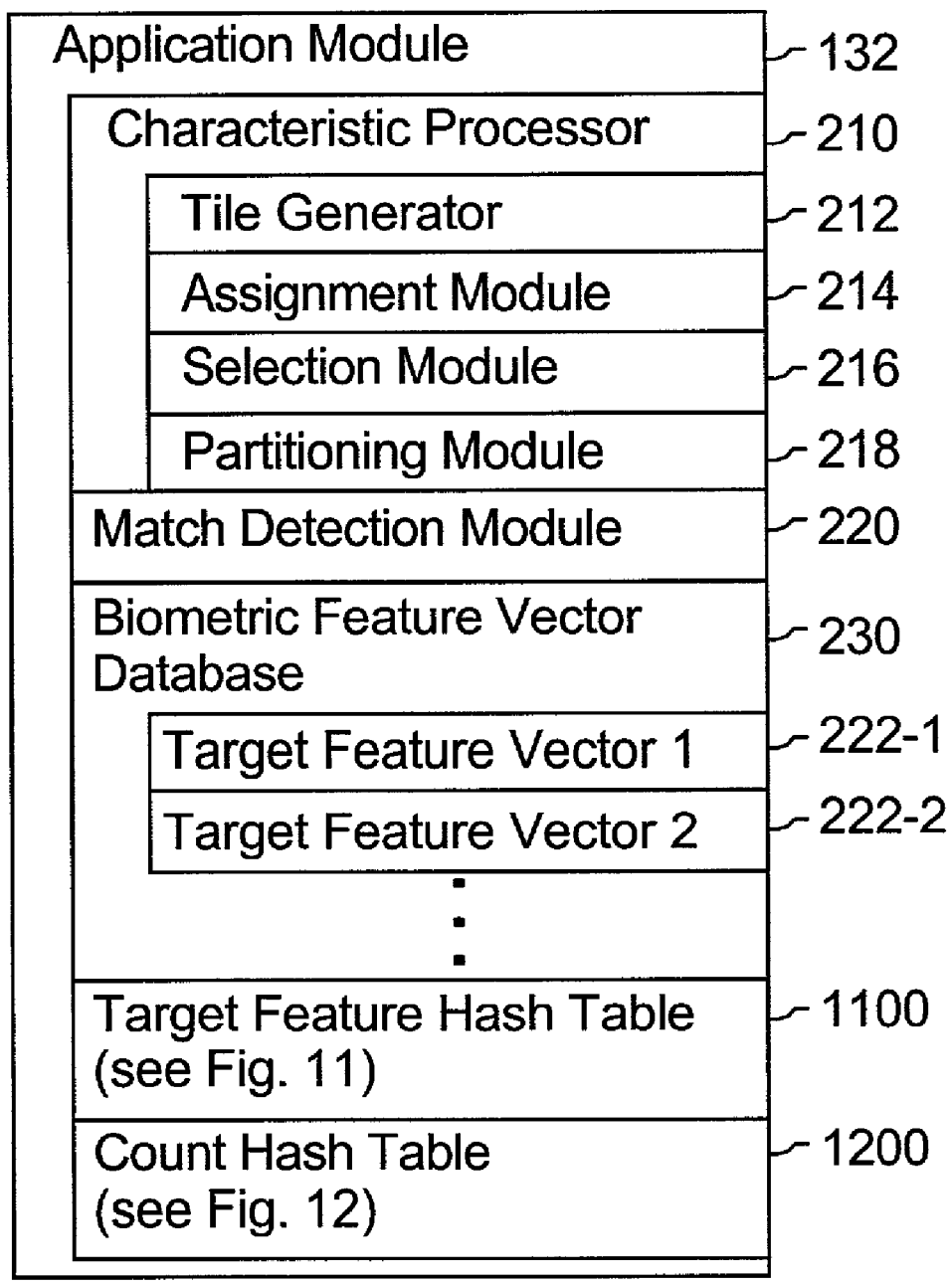
FIG. 2 shows a more detailed structure of an application module in accordance with an embodiment of the invention.

FIG. 2 shows a more detailed structure of an application module in accordance with an embodiment of the invention. Application module 132 includes a characteristic processor 210 and a match detection module 220. Characteristic processor 210 is used to generate a feature vector that corresponds to a biometric vector.

Characteristic processor 210 contains a tile generator 212, an assignment module 214, a selection module 216, and a partitioning module 218, the operation of which is explained below. A feature vector comprises a plurality of features that correspond to a biometric vector, which in turn corresponds to a biometric sample.

In some embodiments, application module 132 does not include a characteristic processor 210. In such embodiments, the characteristic generator 210 is included in the acquisition module 160 resident on client computers/devices 160. In some embodiments, a characteristic generator is included in both server 100 as a component of application module 132 as well as in some or all of the client computers/devices 180 as a component of acquisition module 160.

The likelihood that a given query biometric vector matches a given target biometric vector is very high when a query feature vector representing the query biometric vector shares at least a predetermined number of features in common with a feature vector representing the target biometric vector. Thus, when two feature vectors have at least a predetermined number of features in common, the likelihood that the two feature vectors, and therefore the two biometric vectors represented by the two feature vectors, are identical is very high. The predetermined number of features that must be in common to yield a strong likelihood that a given target feature vector matches a query feature vector is application dependent. In some applications 60% or more of the features in the source and target feature vectors must be identical in order for there to be a chance that the query and target feature vectors represent the same biometric sample. In other applications 80% or more of the features in the source and target feature vectors must be identical in order for there to be a chance that the query and target vectors represent the same biometric sample. A number of variables determine the number of features that must be in common between the source and target feature vectors in order for a chance of identity to arise, including the total number of features in the source and target vectors, the length in bytes of each feature, and so forth.

In FIG. 2, characteristic processor 210 processes target and/or query biometric vectors in accordance with methods disclosed below. It is contemplated that characteristic processor 210 processes a large number of target biometric vectors 136 (FIG. 1) to form a database 230 of biometric feature vectors, herein call target feature vectors 222 (FIGS. 2). Each target feature vector 222 has an associated identifier, which, for instance, may be the index of the target feature vector 222 in the database 230. Alternately, the target feature vector identifier may be a unique identifier stored in an identifier field of each target feature vector 222.

Figure 11:
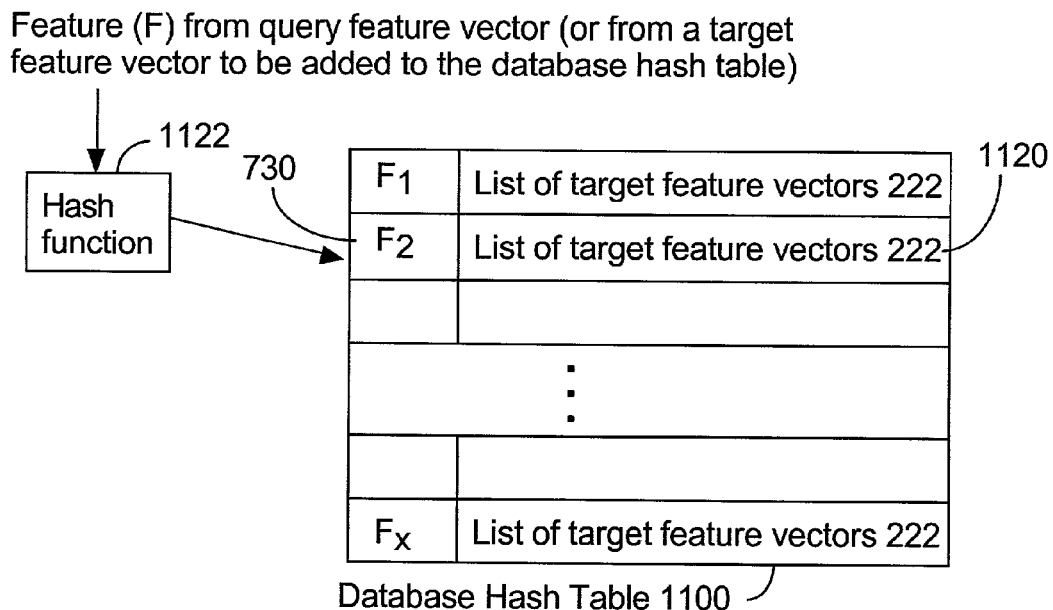
FIGS. 11 shows a database hash table 1100 that is used to find a list of target feature vectors that have at least one feature in common with the query feature vector in accordance with an embodiment of the invention.
Figure 12:
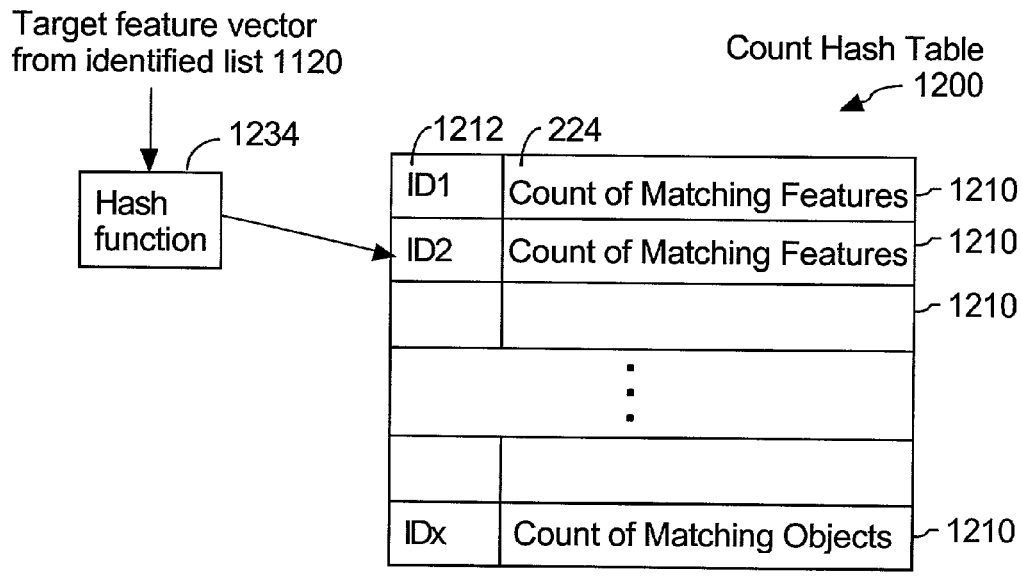
FIG. 12 shows a matching feature count hash table 1200 that is used to find the target feature vectors in a database of such features that have more than a sufficient number of features in common with the query feature vector in accordance with an embodiment of the invention.

While the target feature vectors 222 are stored in a database 230, fast access to the target feature vectors 222 is provided by a target feature hash table 1100, which is shown in more detail in FIG. 11. The target feature hash table 1100 is used when comparing a query feature vector with the target feature vectors of the biometric target feature database 230 to enable very efficient and rapid identification of all target feature vectors that share at least one feature with the query feature vector. Furthermore, a count hash table 1200, which is shown in more detail in FIG. 12, is used to efficiently identify the target feature vectors which have at least a predefined number of features in common with the query feature vector. The use of these two hash tables 1100 and 1200 is described in more detail below.

Tile Generator

Figure 3:
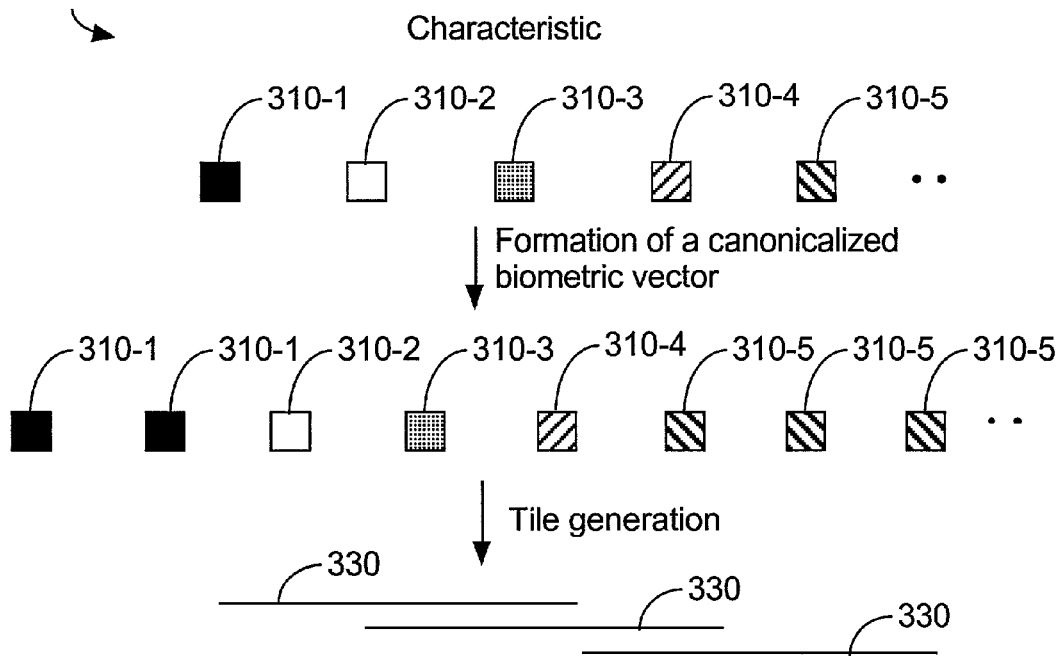
FIG. 3 illustrates a tile generator in accordance with one embodiment of the present invention.
Figure 4:
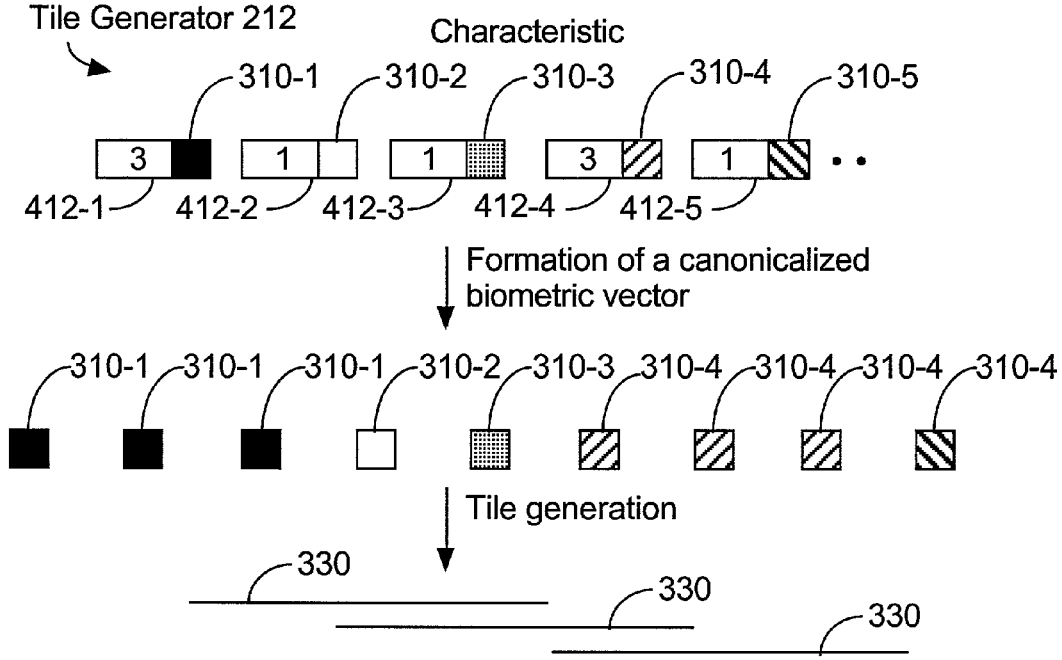
FIG. 4 illustrates a tile generator in accordance with another embodiment of the present invention.

FIGS. 3 and 4 each illustrate a tile generator 212 in accordance with embodiments of the present invention. Tile generator 212 is used to generate tiles 330 that represent a corresponding biometric vector. As will now be described in detail, the process of tile generation in accordance with the present invention begins with the canonicalization of the characteristics within a biometric vector. Then, tiles are generated on a pseudo random basis using the canonicalized biometric vector.

A biometric vector is a set of characteristics 310. In typical embodiments, each characteristic 310 represents a biometric descriptor or a biometric measurement of some underlying biometric sample. For example, in one embodiment, the underlying biometric sample is an eye and each characteristic 310 represents a biometric descriptor associated with the eye. Each biometric descriptor describes aspects of an individual eye. In other embodiments of the present invention, the underlying biometric sample is a fingerprint, a foot print or an assay of a biological specimen. Many other biometric samples are contemplated in the present invention, and all such samples are within the scope of the present invention. For any given underlying biometric sample, the biometric vector provides a sufficient number of characteristics 310 so that the biometric vector clearly describes the underlying biometric sample.

In cases where the query biometric vector 138 and each of the target biometric vectors 136 represent eye measurements, the information used to populate the biometric vector that corresponds to a particular eye may be derived from a scan of the eye that was performed by an electronic device 180 (FIG. 1). Accordingly, one characteristic in the biometric vector may represent the number of radial furrows in the iris of a scanned eye, another characteristic in the biometric vector may represent eye color, and so forth. When this is the case, the query biometric vector 138 describes the number of radial furrows in the iris and the eye color of the query eye, among other characteristics, and each target biometric vector 136 (FIG. 1) describe, among other characteristics, the number of radial furrows and the eye color of target eyes represented in target biometric database 134.

There are two types of characteristics 310 that are used in a biometric vector, variable characteristics and nonvariable characteristics. Variable characteristics represent a biometric descriptor or a biometric measurement that has some degree of inaccuracy and/or other form of variability. Invariable characteristics represent a biometric descriptor or a biometric measurement that, by its nature, does not have some degree of imprecision, inaccuracy, and/or variability. An example of a variable characteristic is, for example, pupil size that is estimated based on a scan of the eye using a machine that is only capable of roughly measuring the dimensions of the pupil. Thus, the scan may indicate a pupil size of 0.5 units, when in fact, because of the inaccuracy in measuring the dimensions of the pupil, the actual size of the pupil may be anywhere from 0.45 units to 0.55 units. An example of an invariable characteristic is the number of radial furrows in the iris of an eye taken from a scan of the eye using a machine that is capable of determining the exact number of radial furrows in the iris or an eye without any uncertainty.

FIG. 3 describes an exemplary tile generator 212 in which the biometric vector is canonicalized by expanding each variable characteristic 310 according to some predetermined algorithm. In the exemplary tile generator of FIG. 3, characteristics 310-1 and 310-5 are variable characteristics whereas 310-2, 310-3, and 310-4 are invariable characteristics. In the canonicalization process illustrated in FIG. 3, the invariable characteristics are simply copied to the canonicalized biometric vector. The variable characteristics, however, are expanded during the canonicalization process using a predetermined algorithm.

The expansion of variable characteristics in the canonicalization process may result in the presence of more than one copy of each of the expanded characteristics 310 in the final canonicalized biometric vector. To illustrate this concept, consider the pupil size example from above where the original characteristic value is reported as 0.5 units but, in fact, the actual pupil size is anywhere from 0.45 units to 0.55 units. In the canonicalization process in accordance with FIG. 3, the original characteristic having a value of 0.5 units is expanded using a predetermined algorithm. One such algorithm may be a function that canonicalizes the characteristic into a set of three characters, the first characteristic having a minimum possible value, the second having the measured value, and the third having the maximum possible value. Thus, in FIG. 3, if 310-5 is a measured pupil size having a value of 0.5, with a possible range of 0.45 to 0.55, then canonicalization using the exemplary predetermined algorithm yields three characteristics 310-5 in the corresponding canonicalized biometric vector, the first characteristic having a value of 0.45, the second characteristic having a value of 0.50, and the final characteristic having a value of 0.55.

The predetermined algorithm presented in the above example illustrates the inventive method. In practice, a variable characteristic may be expanded during the canonicalization process illustrated in FIG. 3 using more complex algorithms. As an example, the variable characteristic that represents pupil size may report a most probable value for a biometric descriptor or a biometric measurement of an underlying biometric sample. And, because of the inaccuracy in the measurement of the pupil size, the probability that the actual value is either greater or smaller than the most probable value may be described as a Gaussian distribution centered on this most probable value. The Gaussian distribution may be approximately represented in the canonicalized biometric vector by a variable gridding scheme where several values in the vicinity of the reported value are used and relatively fewer outlier values are used in the canonicalized biometric vector. Thus, rather than having three characteristics 310-5 to represent pupil size in the canonicalized biometric vector, as described above, the canonicalized vector may include, for example, five characteristics for pupil size with the values (0.45, 0.49, 0.50, 0.51, and 0.55) in order to roughly approximate a Gaussian distribution.

Characteristic variability in one dimension has been described so that the concepts of the invention may be best introduced. However, characteristic variability is not limited to values in a single dimension. A biometric descriptor or a biometric measurement may be described as an n-dimensional number. For example, pupil size may be described by a two dimensional number where the first dimension is the length x along a first axis of the pupil and the second dimension is the length y along a second axis of the pupil perpendicular to the first axis. A two dimensional characteristic 310 is reported as a number (x,y) where the inaccuracy or other form of variability for x is the same or different than the inaccuracy or other form of variability for y. Expansion of a multidimensional variable characteristic using canonicalization in accordance with FIG. 3 yields a set of multidimensional characteristics, each representing the original characteristic in the biometric vector. The value of each of these multidimensional characteristics is determined in accordance with a predetermined algorithm that identifies additional possible values, in n-dimensional space, given an n-dimensional measured value. Many such predetermined algorithms are known in the art, and all such algorithms may be used in accordance with the canonicalization process of the present invention. For example $L_1$-Norm, $L_0$-Norm, and related statistical tools may be used to produce a set of multidimensional characteristics that represent the original characteristic in the biometric vector.

Once the canonicalized biometric vector is generated, tile generator 212 generates tiles 330 on a pseudo random basis. That is, each tile 330 is populated with a different subset of the characteristics found in the canonicalized biometric vector. However, the tile generation process is pseudo random in the sense that the same process is used to generate corresponding tiles 330 from other biometric vectors 136 in biometric characteristic database 134 and/or the query biometric vector 138. In this way, corresponding tiles 330 from different biometric vectors may be meaningfully and rapidly compared using the methods of the invention described below.

FIG. 4 shows a tile generator 212 in accordance with another embodiment of the present invention. In the canonicalization process of FIG. 4, each characteristic in the original biometric vector is provided with a corresponding weight that is indicative of the relative importance of that characteristic. The relative importance of any given characteristic is determined by the extent to which that characteristic c biometric vector contributes to uniquely identifying the underlying biometric sample that with the represents. Thus, for example, a characteristic representing the number of radial furrows in the iris of an eye color may more extensively contribute to the unique identification of a particular eye than a characteristic such as eye color. In some embodiments of the present invention, a characteristic may in fact represent a group of interrelated biometric descriptors or biometric measurements. In such cases, weights are applied to indicate the relative contribution each group makes to uniquely identifying the biometric sample associated with the biometric vector.

In FIG. 4, characteristic 310-1 has a weight 412-1 of "3", 310-2 has a weight 412-2 of "1", 310-3 has a weight 412-3 of "1", 310-4 has a weight 412-4 of "3", and characteristic 310-5 has a weight 412-5 of "1". Thus, in FIG. 4, a determination has been made that characteristics 310-1 and 310-4 are three times as important as characteristics 310-2, 310-3, and 310-5. Therefore, in the canonicalized biometric vector, characteristics 310-1 and 310-4 are represented three times as often as 310-2, 310-3, and 310-5. Because characteristics 310-1 and 310-4 are represented three times as often in the canonicalized biometric vector, characteristics 310-1 and 310-4 are three times more likely to be picked up by a psuedo random function for placement in tiles 330 than characteristics 310-2, 310-3, and 310-5.

The process of expanding variable characteristics (FIG. 3) and weighting characteristics (FIG. 4) has now been described. In some embodiments of tile generator 212, the canonicalization process uses both expansion of variable characteristics and characteristic weighting in order to generate a canonicalized biometric vector. Thus, it will be appreciated that a biometric vector may start with a relatively small set of characteristics, such as 25, but upon canonicalization, there may be as many as 25,000 or more characteristics. Then, using psuedo random functions, each tile is assigned a relatively small set of characteristics, such as 5 to 25 characteristics per tile.

Increasing the number of characteristics in a tile makes the identification procedure more accurate. However, increasing the number of characteristics in a tile also increases sensitivity to minor variations in the biometric samples being compared. Thus, the choice of the number of characters used in each tile is application dependent.

Figure 5:
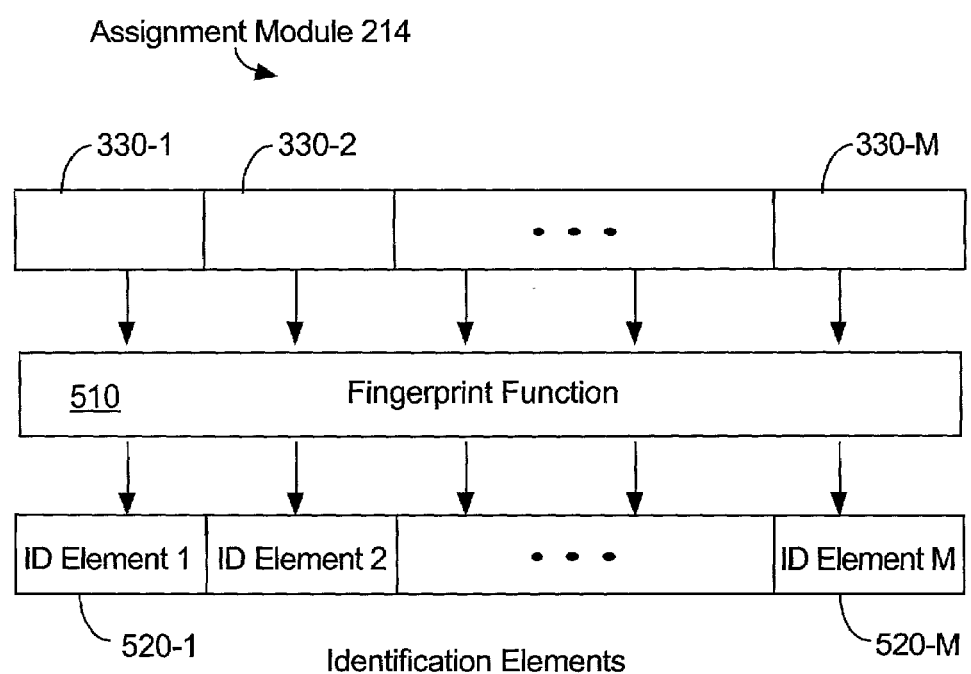
FIG. 5 illustrates an assignment module used to assign identification elements to tiles generated by the tile generator in accordance with one embodiment of the invention.

FIG. 5 illustrates an assignment module 214 used to assign identification elements to tiles 330 generated by tile generator 212 in accordance with one embodiment of the invention. Assignment module 214 is used to assign an identification element 520 to each tile 330 extracted by tile generator 212.

In one embodiment of the present invention, the identification element 520 is generated by applying a fingerprinting function 510 to each tile 330. Fingerprints are unique short tags for large (or relatively large) tiles 330 and have the property that when two fingerprints are different, the corresponding tiles are always different, and there is only an infinitesimally small probability that two different tiles will have the same fingerprint. An exemplary fingerprint function 510 is a one-way hash function.

Figure 6:
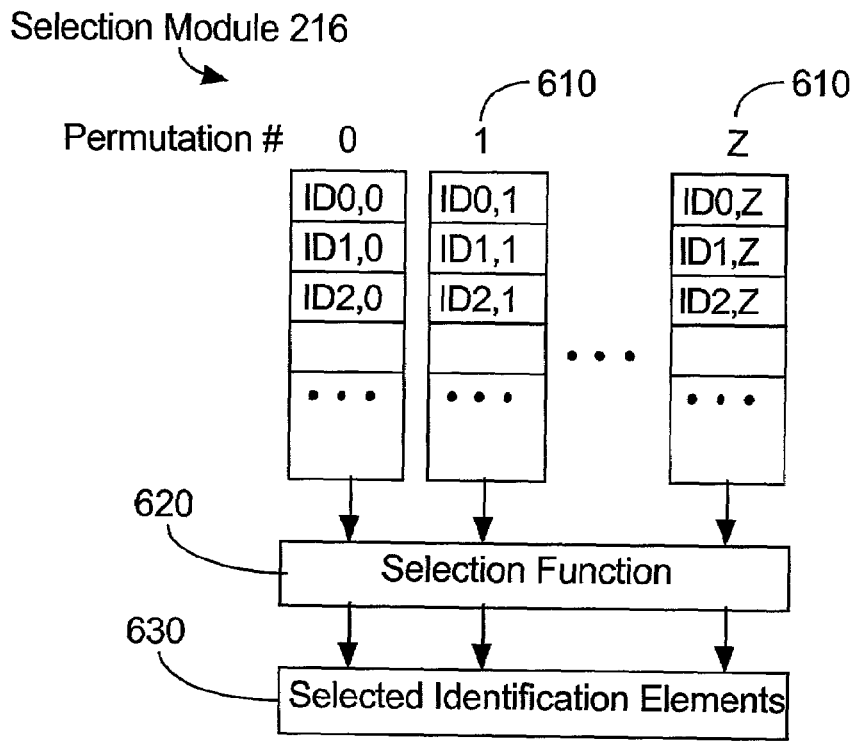
FIG. 6 illustrates the operation of a selection module in accordance with an embodiment of the invention.

FIG. 6 illustrates the operation of a selection module 216 in accordance with an embodiment of the invention. Selection module 216 generates a set of predefined permutations 610 of the identification elements 520 (FIG. 5). Selection module 216 then applies a selection function 620 to permutations 610 and selects a predetermined number of the identification elements from each permutation 610 to generate a set of selected identification elements 630. For instance, the predefined selection function 620 may select the "smallest" identification elements from each permutation 610, where "smallest" is defined as those identification elements that have the lowest numerical values, as measured or determined by the selection function 620. Those skilled in the art will appreciate that in alternate embodiments selection function 620 may select the largest elements (having the largest numerical values), or the elements having the largest or smallest value when a particular function is applied to them. In an alternate embodiment, selection function 620 may be configured to select a predefined number of the identification elements in accordance with predefined selection criteria, using all permuted identification elements as a single pool against which the selection criteria is applied. In this alternate embodiment, the number of identification elements selected from any particular permutation 610 is not fixed, only the total number of selected identification elements is fixed. Many other element selection schemes may be used and all such schemes are within the scope of the present invention.

Figure 7:
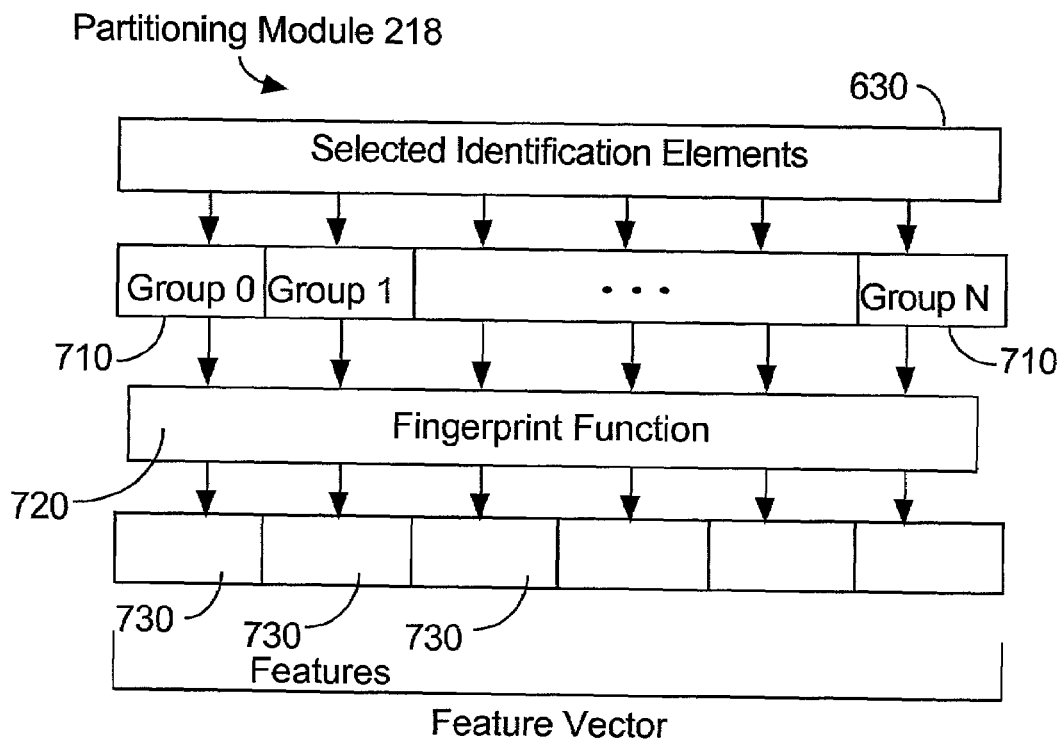
FIG. 7 illustrates the generation of a feature vector from the selected identification elements, where the feature vector comprises a set of features, in accordance with an embodiment of the invention.

FIG. 7 illustrates the generation of a set of features 730 (which together form a feature vector) by partitioning module 218 from the selected identification elements 630. The selected identification elements 630 are partitioned into groups 710, each group including a plurality of identification elements 630. A feature 730 is generated for each group 710 by applying a fingerprinting function 720 to the group. Thus, the generated set of features 730 (feature vector) for a biometric sample is the set of features 730 of the biometric vector for the underlying biometric sample. In one embodiment, fingerprinting function 720 is, or includes, a one way hash function that produces a fixed length feature 730.

Identifying Similar Biometric Samples

Figure 8:
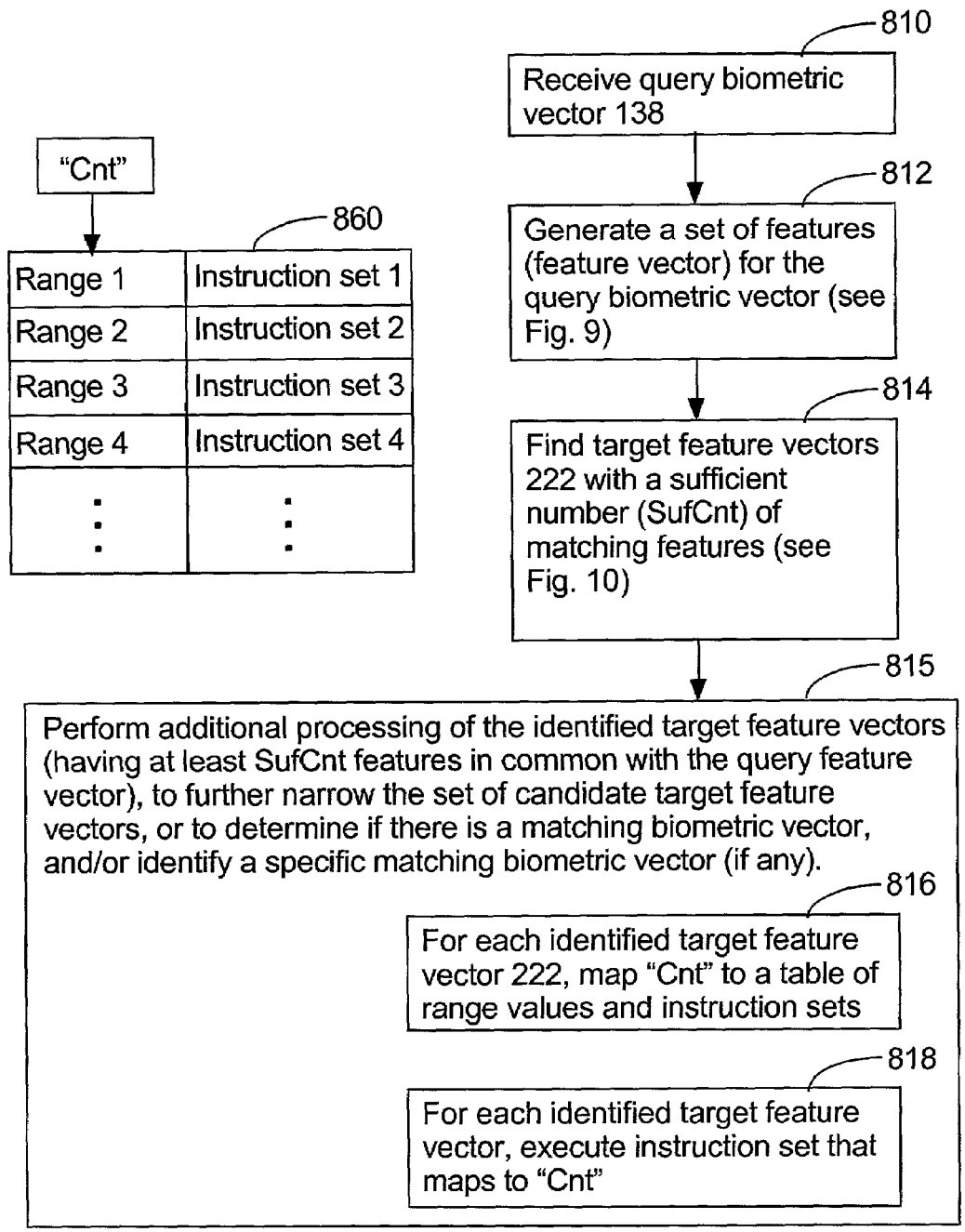
FIG. 8 illustrates exemplary processing steps executed to determine which target feature vectors potentially match a query feature vector generated from a query biometric vector, where target feature vectors that potentially match the query feature vector are further processed by an instruction set that is selected from a plurality of instruction sets 860 based on the degree of similarity between the query and target vector.

FIG. 8 illustrates the processing steps that are executed to determine similar biometric samples in accordance with an embodiment of the invention. From a more general viewpoint, FIG. 8 illustrates the procedure for finding the biometric samples represented in biometric characteristic database 134 that potentially match a query biometric sample. Server 100 (FIG. 1) receives a query biometric vector 138 (representing a query biometric sample) from a client system 180 or some other type of measuring device (step 810). Application module 132 generates a corresponding query feature vector for the query biometric vector 138 using characteristic processor 210 (step 812) in accordance with the methods disclosed in FIGS. 3 through 7.

Application module 132 (FIG. 1) next uses match detection module 220 to determine whether the query biometric sample represented by the query feature vector shares similarity with any target feature vectors 222 that correspond to target biometric vectors 136 in biometric characteristic database 134. To this end, match detection module 220 finds target feature vectors 222 that share at least a predefined, "sufficient" number (SufCnt) of features with the query feature vector (step 814). The processing steps for finding a target feature vector that shares at least a sufficient number of features with the query feature vector are described in greater detail below with reference to FIG. 10. Typically, the number of features that must be common between the query and target vector in order for the target feature to be flagged as interesting is set such that several target feature vectors are identified for any given query feature vector for which there is a matching biometric vector in the biometric characteristic database 134 (FIG. 1). When the query target vector does not, in fact, correspond to any biometric vector in the biometric characteristic database 134, the number of candidate matches may be as low as zero, depending on how many features of the query target vector match features of the target feature vectors in the biometric feature vector database 230.

For each target feature vector identified in step 814, match detection module 220 performs additional processing (815). This additional processing may be to determine if there is a matching biometric vector and to identify the matching biometric vector (if any), or further narrow the set of candidate target feature vectors, or simply to label the identified target feature vectors in accordance with the number of features they share with the query feature vector.

In one example, step 815 includes mapping the number of features shared by the identified target feature vector 222 and the query feature vector (Cnt) onto range table 860 (step 816) and then performing the target feature vector in accordance with a corresponding instruction set (step 818). For example, when Cnt falls into range 1, match detection module 220 maps target feature vector 222 to instruction set 1, when Cnt falls into range 2, match detection module 220 maps target feature vector 222 to instruction set 2, and so forth. In processing step 818, each identified target feature vector is processed in accordance with the particular instruction set to which it was mapped in processing step 816. In another example, all the identified target feature vectors are processed by identifying the corresponding biometric vectors and then performing a full comparison of the query biometric vector with the identified biometric vectors so as to find the matching biometric vector, if any, in the biometric characteristic database 134 (FIG. 1).

An illustration of the mapping process using range table 860 is now provided. In this illustration, instruction set 1 flags the identified target feature vector as one of potential interest, instruction set 2 provides a more detailed comparison of the identified target feature vector and the query feature vector, instruction set 3 provides an exhaustive comparison of the target biometric vector, which corresponds to the identified target feature vector, and the query biometric vector, and instruction set 4 flags the biometric sample associated with the identified target feature vector as a probable match. As this illustration shows, the level of confidence that a particular feature vector is a match to the query, as quantified by the number of matching features between the query and target vector, may be used to determine how much follow-up comparison is performed between the query and target biometric samples. This follow-up comparison may be, for example, between relatively small feature vectors or relatively large biometric vectors.

Generating Feature Vectors

Figure 9:
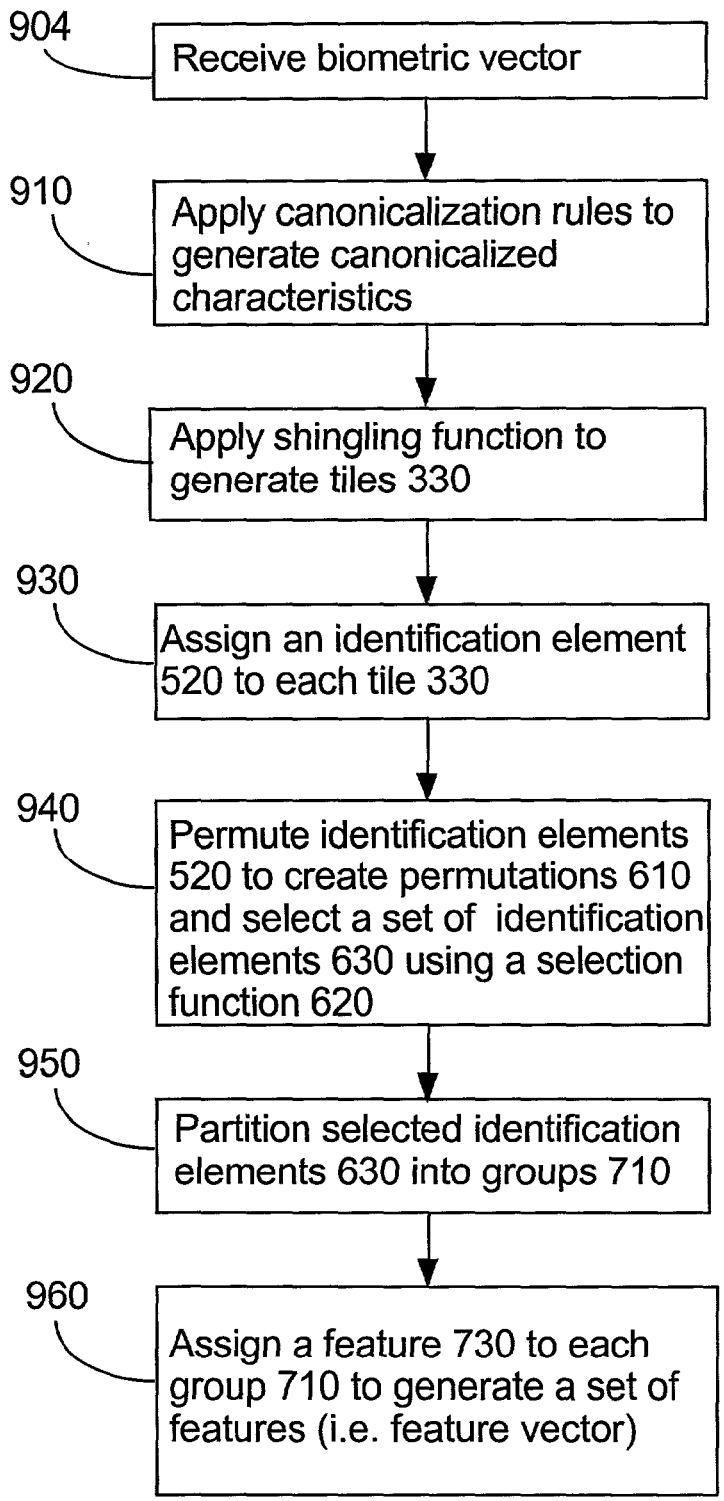
FIG. 9 illustrates processing steps used to generate a feature vector that represents a biometric metric vector, which in turn represents a biometric sample, in accordance with an embodiment of the invention.

FIG. 9 illustrates the processing steps used to generate a feature vector for a biometric sample. The process begins when a biometric vector is received (step 904). Then, a canonical set of characteristics is generated based on the received biometric vector in accordance with FIG. 3 and/or FIG. 4 (step 910). Characteristic processor 210 applies a shingling function to the canonical set of characteristics to generate tiles 330 (step 920). This shingling function is depicted schematically in FIGS. 3 and 4. Characteristic processor 210 then assigns an identification element 520 (as shown in FIG. 5) to each tile 330 (step 930). Next, characteristic processor 210 permutes each identification element 520 to form a set of permuted identification elements 610 in accordance with FIG. 6. Characteristic processor 210 applies a selection function 620 to the set of permuted identification elements 610 to yield selected identification elements 630 (step 940). An illustrative selection function 620 selects the minimum (smallest) element from each set of predetermined permutations 610 for the biometric vector. Each predetermined permutation may be performed using a random function, but once a particular function is used, the same function is used for processing the corresponding identification elements of other biometric vectors. Because the same random function is used to permute corresponding identification elements from each biometric vector, the functions used to permute each identification elements are considered pseudo random.

The selected set of identification elements 630 identified in step 940 are then partitioned (step 950) into groups 710 in accordance with FIG. 7. Preferably, each of the groups contain the same number of elements, e.g., six elements. Each group 710 is then further reduced to a feature 730 by applying a fingerprinting function to the group (FIG. 7) (step 960). This set of features is a feature vector for the biometric vector. In one embodiment, the fingerprinting function applied to the groups 710 is, or includes, a one-way hash function that produces a fixed size feature value.

Number of Feature Matches between Query and Target Feature Vectors

Figure 10:
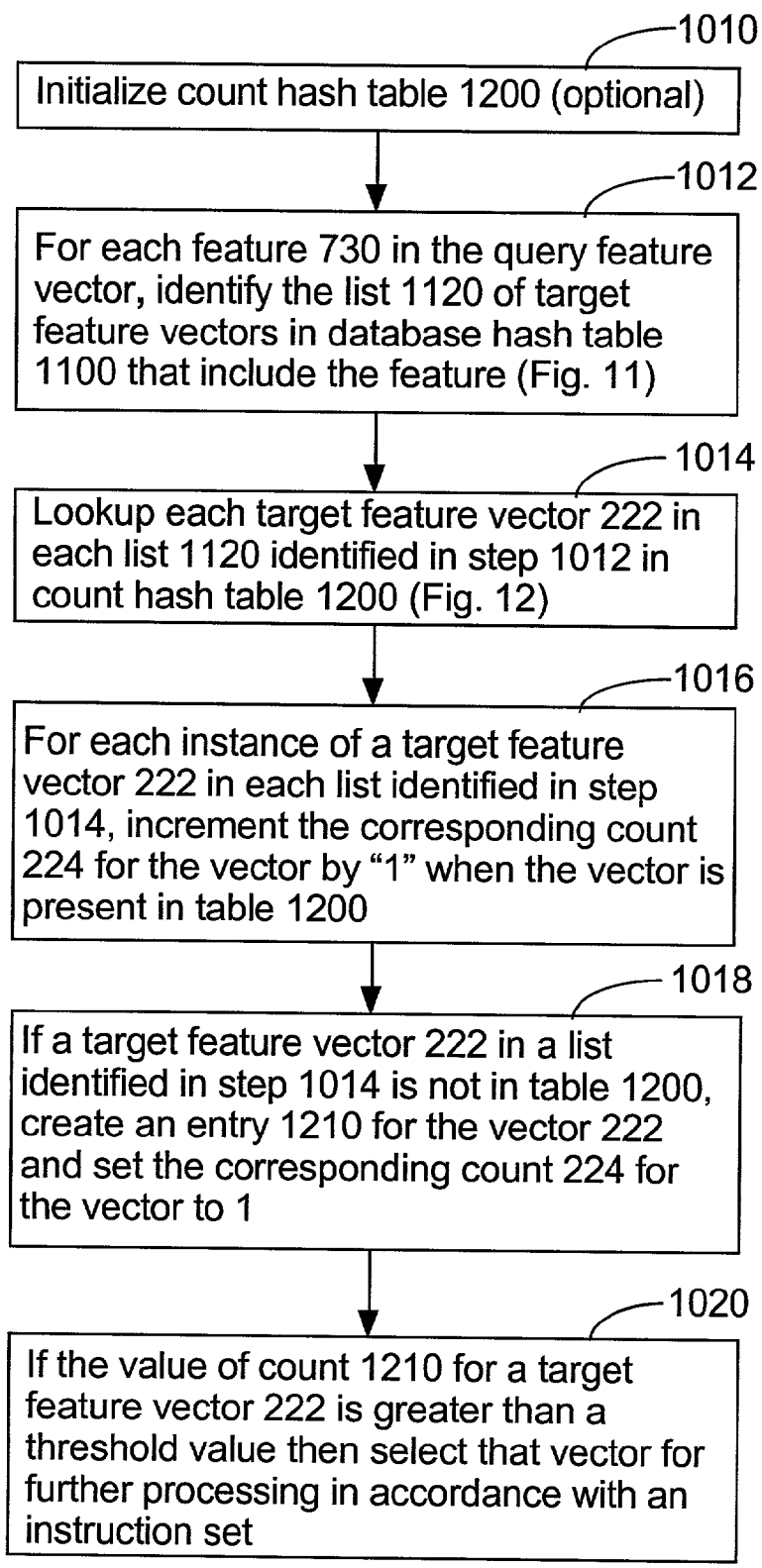
FIG. 10 illustrates processing steps for determining which target feature vectors potentially match a query feature vector in accordance with an embodiment of the invention.

FIG. 10 illustrates processing steps for identifying the number of features that each target feature vector has in common with the query feature vector in accordance with one embodiment of the present invention. As such, the processing steps shown in FIG. 10 represent an exemplary implementation of step 814 in FIG. 8.

In the illustrative embodiment, match detection module 220 identifies all target feature vectors 222 that share at least one feature in common with the query feature vector. Match detection module 220 then determines which of the identified target feature vectors share a sufficient number of features with the query feature vector and processes each target feature vector having at least a predefined sufficient number of common features. This processing may be uniform for all the identified target feature vectors having at least the predefined number of features in common with the query target vector, or it may vary based on the number of common features that the identified target feature vector shares with the query feature vector.

In step 1010, match detection module 220 initializes all the entries 1210 of a count hash table 1200 (FIG. 12), for example by storing null values in the fields of the entries (step 1010). The number of entries in the count hash table 1200 is preferably much smaller than the number of target feature vectors in the biometric feature vector database 230 (FIG. 2), but sufficient to hold entries representing all target feature vectors that have at least one feature in common with the query target vector. For instance if each target feature vector has N features in it, and the longest list of feature vectors in the database hash table 110 is L, then the count hast table 1200 will preferably include at least N*L entries 1210. Each entry 1210 of the count hash table 1200 contains a target feature vector identifier 1212 and a count 224. The identifier 1212 uniquely identifies one target feature vector in the biometric feature vector database 230 (FIG. 2); in one embodiment the identifier 1212 is the index of the corresponding target feature vector in the biometric feature vector database 230 and in another embodiment the identifier is a pointer to the memory storage location of the corresponding target feature vector in the biometric feature vector database 230. In yet another embodiment, the identifier 1212 is a copy of the corresponding target feature vector, and in a further embodiment the identifier 1212 specifies the location of the corresponding target biometric vector 136 in the biometric characteristic database 134 (FIG. 1). Upon completion of the processing steps shown in FIG. 10, the count 224 in each entry 1210 represents the number of features that the target feature vector identified by identifier 1212 has in common with the query feature vector.

In step 1012, match detection module 220 finds a list of target feature vectors 222 that include a match to the first feature 730 in the query feature vector (FIG. 11). In one embodiment, match detection module 220 finds the list of target feature vectors by performing a lookup in a database hash table 1100. Each entry in table 1100 provides a feature 730 ($F_x$) and a list 1120 of identifiers of the target feature vectors 222 that include the feature 730. Each target feature vector 222 identified in each list 1120 corresponds to a target biometric vector 136 in biometric characteristic database 134. In an exemplary implementation of step 1012, a lookup in the database hash table 1100 is performed by applying a hash function 1122 to the specified feature 730 to generate a pointer to a record in the hash table 1100. Then the hash table 1100 is searched from that point until either the record for the specified feature 730 is located or a maximum number of records is searched, indicating that the hash table 1100 does not contain a record for the specified feature 730. The same hash function 1122 is used when adding target feature vectors to the database hash table 1100 and when looking up the features of a specified query feature vector.

For each list 1120 identified in step 1012, match detection module 220 searches count hash table 1200 (FIG. 12) for each feature 730 in the list (step 1014). Each entry 1210 in count hash table 1200 includes the identifier 1212 for a particular target feature vector and a count 224 that tracks the number of features that the particular target feature vector has in common with the query feature vector. For each instance of a target feature vector 222 that is present in a list identified in step 1012, the corresponding count 1210 in count hash table 1200 for the vector 222 is incremented by one (step 1016). When an entry 1210 is not found in count hash table 1200 for a particular target feature vector identifier, an entry 1210 that corresponds to the missing vector is added to table 1200. If an entry 1210 is added to table 1200 in this manner, the entry is populated with the identifier of the missing target feature vector and the corresponding count 224 for the vector is initialized to a value of one (step 1018). Thus, after completion of processing steps 1012 through 1018, count hash table 1200 has a record of the identifiers of the target feature vectors 222 that share at least one feature in common with the query feature vector. Furthermore, for each feature vector 222 that shares at least one feature with the query feature vector, table 1200 has a record of the number of features that the vector 222 has in common with the query feature vector.

Once processing steps 1016 and 1018 are completed, processing step 1020 is performed. In processing step 1020, each target feature vector 222 that has a count 1210 greater than a predefined threshold value is processed in accordance with an instruction set. In some embodiments of the present invention, the particular instruction set that is used to process the target feature vector 222 is determined using a mapping scheme such as that disclosed in FIG. 8.

An example of the processing steps of FIG. 10 is now provided. Prior to execution of the processing steps of FIG. 10, application module 132 generates a query feature vector from query biometric vector 138. The query feature vector consists of the set (Feature 1, Feature 2, . . . , Feature N). Match detection module 220 then finds a feature 730 from the set $(F_1, \ldots, F_x)$(FIG. 11) in database hash table 1100 that matches Feature 1 of the query feature vector. If database hash table 1100 does not contain a feature matching Feature 1, match detection module 220 performs no further action using Feature 1 of the query feature vector.

If database hash table 1100 does contain a feature 730 matching Feature 1 of the query feature vector, match detection module 220 extracts the list of vector feature identifications 1120 corresponding to the feature 730. Match detection module 220 next accesses a count table entry 1210 for each target feature vector identifier in the list 1120. As described above, each entry 1210 in count hash table 1200 includes a first field 222 for storing the identifier of the target feature vector 222 and a second field 224 for storing the matching count value. Match detection module 220 initially sets count 224 to "1" whenever it creates a new entry 1210 in table 1200.

After processing Feature 1 of the query feature vector in the manner described above, match detection module 220 moves to the next feature, Feature 2, in the query feature vector and finds a feature 730 in hash table 1100 that matches Feature 2. If the table 1100 does not contain a feature matching Feature 2, then module 220 performs no further action using Feature 2 of the query feature vector. If hash table 1100 does contain a feature 730 matching Feature 2, then module 220 extracts the list 1210 of identifiers of target feature vectors 222 that correspond to the matched feature. Match detection module 220 next looks in the count hash table 1200 for each target feature vector identifier of the newly identified list 1120 of document identifications (step 1014).

In one embodiment of the present invention, a lookup in count hash table 1200 in accordance with step 1014 is performed by applying a hash function 1234 to the target feature vector identifier to generate a pointer to a record in count hash table 1200, and then count hash table 1200 is searched from that point until either the record for the specified vector is located or a maximum number of records are searched, indicating that table 1200 does not contain a record for the specified vector.

For each target feature vector 222 found in count hash table 1200, match detection module 220 increments the corresponding count 1210 by "1" (step 1016). If a target feature vector in a list identified in step 1012 is not in count hash table 1200, then module 144 creates an entry 1210 in count hash table 1210 and adds the target feature vector identifier 1212 to the entry and further sets the corresponding count 224 to "1" (step 1018). Match detection module performs steps 1012 through 1018 for each feature in the query feature vector and then executes step 1020.

The present invention can be implemented as a computer program product that includes a computer program mechanism embedded in a computer readable storage medium. For instance, the computer program product could contain the program modules shown in FIGS. 1 and 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave or as a baseband signal.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for finding one or more target biometric samples that are similar to or match a query biometric sample, comprising:
   generating a query feature vector from a query biometric vector that represents said query biometric sample, said query feature vector comprising a plurality of features and said query biometric vector comprising a set of characteristics; and
   comparing said query feature vector to a plurality of target feature vectors, each target feature vector representing a respective target biometric sample; wherein,
   a target biometric sample is a potential match to said query biometric sample when a threshold number of features in the target feature vector that corresponds to said target biometric sample are identical to features in said query feature vector, wherein the generating comprises:
   extracting a set of tiles that represents said query biometric sample, each tile including a plurality of characteristics;
   assigning an identification element to each said tile in said set of tiles;
   selecting a predetermined number of the identification elements;
   partitioning the selected identification elements into a plurality of partitioned groups; and
   applying a fingerprint function to each partitioned group to generate a set of features, said set of features representing said query feature vector.

2. The method of claim 1, wherein said extracting step further comprises:
   canonicalizing each characteristic associated with said query biometric sample to create a plurality of canonicalized characteristics; and obtaining a pseudo randomly selected subset of said plurality of canonicalized characteristics to form each said plurality of characteristics included in said set of tiles.

3. The method of claim 2, wherein a characteristic associated with said query biometric sample is a variable characteristic and said canonicalizing step includes expansion of said variable characteristic using a predetermined function.

4. The method of claim 2, wherein said canonicalization of each said characteristic associated with said query biometric sample includes application of a respective weight to each said characteristic, the respective weight determining a number of copies of said characteristic that are present in said plurality of canonicalized characteristics.

5. The method of claim 1, wherein each target feature vector in said plurality of target feature vectors is generated by:
extracting a set of tiles that represent a respective target biometric sample, each tile including a plurality of characteristics;
assigning an identification element to each said tile in said set of tiles:
selecting a predetermined number of the identification elements;
partitioning the selected identification elements into a plurality of groups; and
applying a fingerprint function to each group to generate a set of features, said set of features representing said target feature vector.

6. The method of claim 5, wherein said extracting step further comprises:
canonicalizing the characteristics associated with said respective biometric sample to create a plurality of canonicalized characteristics; and
obtaining a pseudo randomly selected subset of said plurality of canonicalized characteristics to form each said plurality of characteristics included in said set of tiles.

7. The method of claim 6, wherein a characteristic associated with said respective biometric sample is a variable characteristic and said canonicalizing step includes expansion of said variable characteristic using a predetermined function.

8. The method of claim 6, wherein said canonicalization of each said characteristic associated with said respective biometric sample includes application of respective weight to each said characteristic, the respective weight determining a number of copies of said characteristic that are present in said plurality of canonicalized characteristics.

9. The method of claim 1, wherein the selecting includes selecting the identification elements using a selection function.

10. The method of claim 5, wherein the selecting includes selecting the identification elements using a selection function.

11. The method of claim 1, wherein each of the set of features is a one-way hash of a group.

12. The method of claim 5, wherein each of the set of features is a one-way hash of a group.

13. The method of claim 1, wherein the comparing includes:
extracting from a database a set of target feature vectors, each extracted target feature vector including at least one feature that is in common with a feature in said query feature vector:
locating each target feature vector in the set of target feature vectors in a count hash table, that count hash table including target feature vector identifications corresponding to target feature vectors that share at least one feature in common with the target feature vector, the count hash table including a count of matching features for each target feature vector represented by the table; and
incrementing the count of matching features for each located target feature identification.

14. A computer program product for use in conjunction with a computer system, the computer program product comprising a computer readable storage medium and a computer program mechanism embedded therein, the computer program mechanism comprising:
a data structure including a plurality of target feature vectors, each target feature vector representing a respective target biometric sample;
a module for finding one or more said respective target biometric samples that are similar to or match a query biometric sample, said module including instruction for:
generating a query feature vector from a query biometric vector that represents said query biometric sample, said query feature vector comprising a plurality of features and said query biometric vector comprising a set of characteristics; and
comparing said query feature vector to said plurality of target feature vectors; wherein,
a target biometric sample is a potential match to said query biometric sample when a threshold number of features in the target feature vector that corresponds to said target biometric sample are identical to features in said query feature vector, wherein the instructions for generating comprise:
instructions for extracting a set of tiles that represents said query biometric sample, each tile including a plurality of characteristics;
instructions for assigning an identification element to each said tile in said set of tiles;
instructions for partitioning the selected identification elements into a plurality of partitioned groups; and
instruction for applying a fingerprint function to each partitioned group to generate a set of features, said set of features representing said query feature vector.

15. The computer program product of claim 14, wherein said instructions for extracting further comprise:
instructions for canonicalizing each characteristic associated with said query biometric sample to create a plurality of canonicalized characteristics; and
instructions for obtaining a pseudo randomly selected subset of said plurality of canonicalized characteristics to form each said plurality of characteristics included in said set of tiles.

16. The computer program product of claim 15, wherein a characteristic associated with said query biometric sample is a variable characteristic and said instructions for canonicalizing includes expansion of said variable characteristic using a predetermined function.

17. The computer program product of claim 15, wherein said instructions for canonicalization for each said characteristic associated with said respective biometric sample includes application of a respective weight to each said characteristic, the respective weight determining a number of copies of said characteristic that are present in said plurality of canonicalized characteristics.

18. The computer program product of claim 14, wherein said module further includes instructions for creating each target feature vector in said plurality of target feature vectors, said instructions for creating including:
- instructions for extracting a set of tiles that represent a respective target biometric sample, each tile including a plurality of characteristics;
- instructions for assigning an identification element to each said tile in said set of tiles;
- instructions for selecting a predetermined number of the identification elements;
- instructions for partitioning the selected identification elements into a plurality of groups; and
- instructions for applying a fingerprint function to each group to generate a set of features, said set of features representing said target feature vector.

19. The computer program product of claim 18, wherein said instructions for extracting further comprise:
- instructions for canonicalizing the characteristics associated with said respective biometric sample to create a plurality of canonicalized characteristics; and
- instructions for obtaining a pseudo randomly selected subset of said plurality of canonicalized characteristics to form each said plurality of characteristics included in said set of tiles.

20. The computer program product of claim 19, wherein a characteristic associated with said respective biometric sample is a variable characteristic and said instructions for canonicalizing include expansion of said variable characteristic using a predetermined function.

21. The computer program product of claim 19, wherein said instructions for canonicalization of each said characteristic associated with said respective biometric sample includes application of a respective weight to each said characteristic, the respective weight determining a number of copies of said characteristic that are present in said plurality of canonicalized characteristics.

22. The computer program product of claim 14, wherein said instructions for selecting include instructions for selecting the identification elements using a selection function.

23. The computer program product of claim 18, wherein said instructions for selecting include instructions for selecting the identification elements using a selection function.

24. The computer program product of claim 14, wherein each of the set of features is a one-way hash of a group.

25. The computer program product of claim 18, wherein each of the set of features is a one-way hash of a group.

26. The computer program product of claim 14, wherein the instructions for comparing include:
- instructions for extracting from said data structure a set of target feature vectors, each extracted target feature vector including at least one feature that is in common with a feature in said query feature vector;
- instructions for locating each target feature vector in the set of target feature vectors in a count hash table, the count hash table including target feature vector identifications corresponding to target feature vectors that share at least one feature in common with the target feature vector, the count hash table including a count of matching features for each target feature vector represented by the table; and
- instructions for incrementing the count of matching features for each located target feature identification.

* * * * *

UNITED STATES PATENT AND TRADEMARK OFFICE
CERTIFICATE OF CORRECTION

PATENT NO. : 7,203,343 B2  
APPLICATION NO. : 09/960583  
DATED : April 10, 2007  
INVENTOR(S) : Mark S. Manasse et al.

It is certified that error appears in the above-identified patent and that said Letters Patent is hereby corrected as shown below:

In column 15, line 22, in Claim 5, after "tiles" delete ":" and insert -- ; --, therefor.

In column 15, line 46, in Claim 8, after "application of" insert -- a --.

In column 15, line 65, in Claim 13, after "vector" delete ":" and insert -- ; --, therefor.

In column 15, line 67, in Claim 13, after "table," delete "that" and insert -- the --, therefor.

In column 16, line 60, in Claim 17, after "canonicalization" delete "for" and insert -- of --, therefor.

Signed and Sealed this

Twenty-second Day of September, 2009

David J. Kappos
*Director of the United States Patent and Trademark Office*